March 24, 1970  C. SEGAL  3,501,878
SOUND AND HEAT INSULATING PANELS
Filed May 22, 1967  3 Sheets-Sheet 3

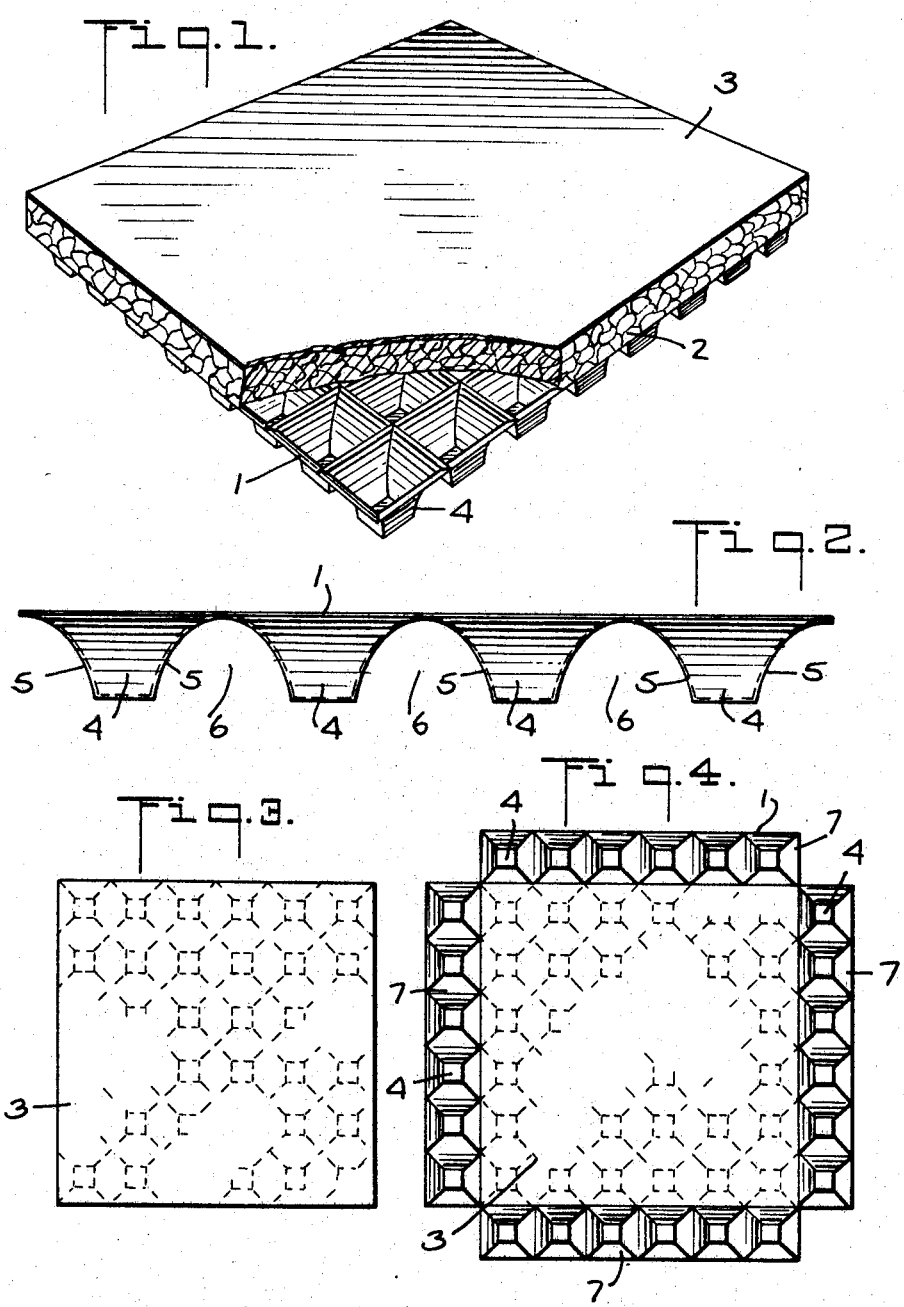

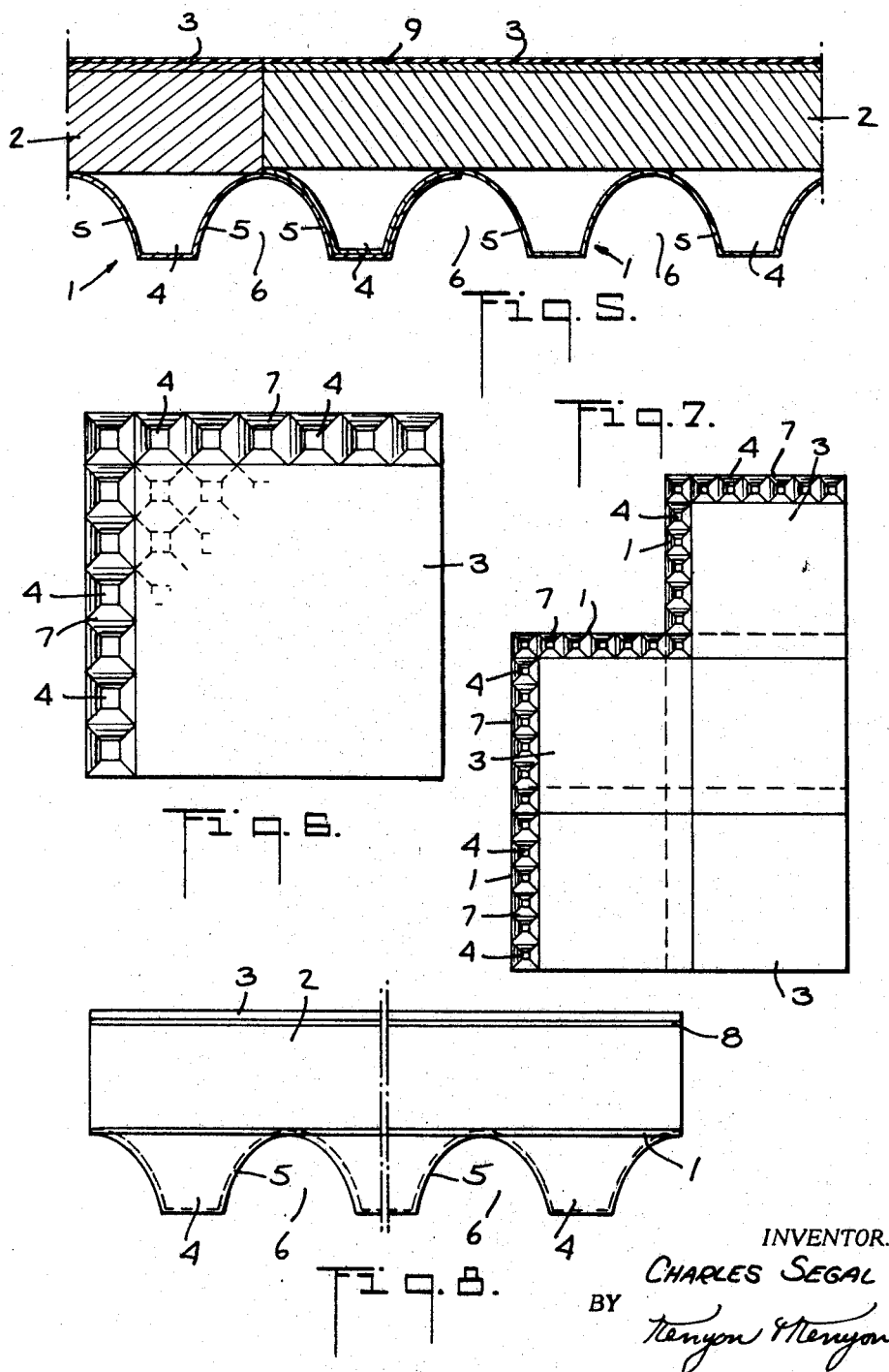

INVENTOR.
CHARLES SEGAL
BY Kenyon & Kenyon
ATTORNEYS

United States Patent Office 3,501,878
Patented Mar. 24, 1970

3,501,878
SOUND AND HEAT INSULATING PANELS
Charles Segal, 24 Mozart St., Antwerp, Belgium
Filed May 22, 1967, Ser. No. 645,844
Claims priority, application Belgium, Nov. 8, 1966,
689,396
Int. Cl. E04b 1/74; G10k 11/00
U.S. Cl. 52—144                                10 Claims

ABSTRACT OF THE DISCLOSURE

This disclosure relates to an insulating panel wherein a plurality of hollow protuberances are provided to strengthen the panel and also form air cavities when an insulating layer of cork and asphalt is adhered thereto. A moisture repellant surface is disposed adjacent the insulating layer to provide an integrated lightweight and effective insulation structure. A means for interlocking adjacently spaced panels is included to allow for fabrication of walls, ceilings, roofs and the like.

---

The present invention concerns an improved insulating panel for use where a lightweight thermal and/or acoustic insulation is required, e.g., on walls, floors, ceilings, refrigerated containers and vehicles, and on many other structures.

Various forms of building insulation panels have been proposed which present a device separating the insulating panel from the supporting surface so as to permit the free circulation of air between the two. The present invention concerns panels of this type, and particularly concerns the form and composition of the panels.

A main object of the invention is to provide optimum insulating qualities in a lightweight panel through the integration of materials of differing insulating properties. In addition, the form of the panels permits rapid installation and reduces the possibility of harmful accumulation of humidity between the panels and the supporting surface.

The panels according to the present invention comprise a planar base element of lightweight heat insulating material, such as a synthetic plastics material, into which is formed a plurality of hollow protuberances spaced across one face and serving, when the panel is in position, to separate the planar base from the underlying supporting surface so that an air cavity is defined therebetween. The insulating properties of the panel are further enhanced by the volume of air trapped in the hollows of such protuberances.

The hollow protuberances are preferably arranged in a uniform pattern over the face of the planar base and preferably take the form of studs which may be any of several possible cross-sectional shapes and which preferably decrease in cross-sectional area in a direction away from the planar base.

To the underside of the planar base, layers of other insulating materials are bonded so as to yield a multi-layer panel of optimum insulating qualities.

In a preferred embodiment of the present invention, a layer of thermal-acoustic insulating material, composed of cork and bitumin, is bonded to the underside of the planar base, and a further layer of water-resistant material is bonded to such insulating layer.

The incorporation and composition of these additional layers will vary, however, in function with the use for which the panels are intended.

The panels according to the present invention are adapted to be laid one beside the other to form a complete insulating surface over the structure being insulated. For this purpose, the panels will generally have a regular geometric shape, such as rectangular, triangular or hexagonal.

Also, ventilation pipes may be provided at intervals extending through the panels to promote circulation of air beneath the panels and thereby further avoiding accumulation of destructive humidity between the panels and the supporting surface.

Another feature according to the present invention is that the planar base in which the protuberances are formed may be extended on one or more sides beyond the edges of the insulating panel, itself. Thus, adjoining panels can be mounted by interlocking the outermost row of protuberances on one panel into the outmost row of hollow protuberances of the adjoining panel.

Preferred embodiments of the present invention and its essential characteristics will be further described with reference to the accompanying drawings, wherein:

FIG. 1 is a perspective view, partially cut away, of one embodiment of the present invention in which 1 indicates the planar base into which hollow protuberances, 4, in the shape of truncated pyramids have been formed. 2 indicates a layer of cork and bitumin, bonded to the planar base and 3 indicates a layer of water-resistant material bonded to the insulating layer.

FIG. 2 is a diagrammatic side view of the protuberances formed in the planar base of the panel illustrated in FIG. 1.

FIG. 3 is a plan view of the panel illustrated in FIG. 1.

FIG. 4 is a plan view of another embodiment of the present invention in which the planar base has been extended beyond the edges of the insulating panel on all four sides.

FIG. 5 is a diagrammatic side view illustrating the interlocking of adjacent panels of the forms illustrated in FIGS. 3 and 4.

FIG. 6 is a plan view of another embodiment of the invention in which the planar base has been extended beyond the edges of the insulating panel on two adjacent sides.

FIG. 7 is a plan view illustrating the interlocking of adjacent panels of the form illustrated in FIG. 6.

FIG. 8 is a diagrammatic side view of another embodiment of the present invention in which a layer of aluminum foil has been bonded, at point 8, between the insulating layer, 2, and the water-resistant layer, 3.

Figure 9:
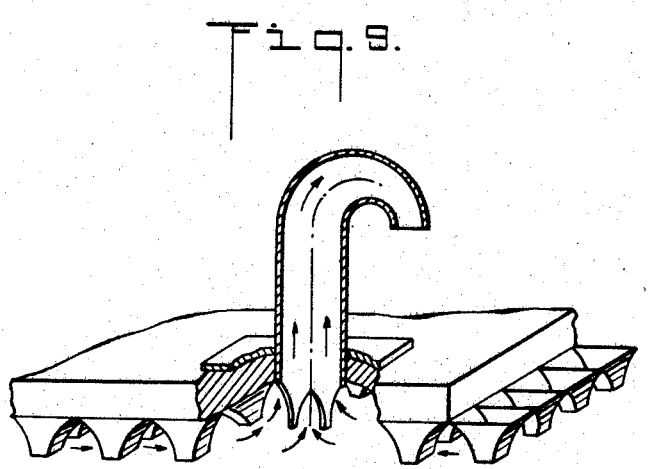
FIG. 9 is a perspective view of one form of the present invention, through which a ventilation pipe has been mounted.

Referring to FIG. 1, the panel according to the present invention is shown in rectangular form. The planar base presents, across its entire surface, regularly spaced rows of hollow protuberances which serve to support the panel in spaced relation to the underlying surface. There is thus formed an air space between the panel and the underlying surface, while an additional insulating volume of air is trapped in the space formed by the hollows of the protuberances and the overlying insulating layer, 2. Panels of this form would be mounted by use of a contact adhesive used in dabs between e.g., the faces of the four corner protuberances and the support surface.

In addition to the use of adhesive at the four corners in mounting, an extremely efficient insulated surface could be realized by mounting the embodiment of the invention illustrated in FIGS. 1 and 3 with the embodiment of the invention illustrated in FIG. 4, in "checkerboard" alternation. Thus, the outermost row of the protuberances on each side of the FIG. 1 and 3 type panels would be interlocked into the hollows of the corresponding outermost row of protuberances of the adjacent FIG. 4 type panel. If desired, the joints between the interlocking panels may be sealed with a contact adhesive or by other suitable means.

Furthermore, once the panels have been mounted, they may be covered by an additional water-resistant material such as an asphalt based product, which would be spread over the entire surface of the mounted panels, as illustrated diagrammatically at point 9 of FIG. 5.

The embodiment of the present invention illustrated in FIG. 6 permits interlocking mounting of the panels without the necessity of using panels of two different forms. As illustrated in FIG. 7, the FIG. 6 type panel, when used alone, offers the interlocking advantage. In order to avoid a triple overlapping of elements, the "northwest" corner of FIG. 6 type panels may be removed. However, this is not essential and interlocking mounting may be effected with the northwest corner in place, as illustrated in FIG. 7.

Numerous variations both as to dimension and composition of the panels are readily practicable. For example, as illustrated in FIG. 8, a layer of aluminum foil, desirable for both its heat reflecting and fire-resistant properties, may be bonded into the panel. In addition, where overall fire-resistance is desired, the planar base may be made of e.g., a plastic which chars without burning.

As the panels comprising the invention are extremely light in weight, economies of cost in the supporting structures, which may therebe of lighter weight than would be necessary if a heavier insulating panel were employed, are also realized as one of the consequent advantages of the invention.

By their form, the panels comprising the present invention may be used for a broad variety of purposes, the extent of which will be apparent to one skilled in the art.

What I claim is:

1. An insulating panel comprising a base layer of a synthetic material having formed thereon a plurality of hollow protuberances each of which has a cross sectional area which decreases as a function of the distance from said base layer and which have closure walls substantially parallel to said base layer, an insulating layer of cork and asphalt spaced contiguous to said base layer to cause said hollow protuberances to form an air cavity therein, a layer of substantially water repellant material in the form of a bitumen impregnated fiber disposed contiguous to said insulating layer, and locking means spaced along the edge of said panel to facilitate interlocking of adjacently spaced panels.

2. An insulating panel in accordance with claim 1 wherein said locking means comprises a row of said adjacently spaced hollow protuberances extending beyond said insulating layer and said layer of water repellant material.

3. An insulating panel in accordance with claim 2 which further includes a ventilation means extending through said panel.

4. An insulating panel adapted to be interconnected with an adjacently spaced panel which comprises a base layer having a plurality of adjacently spaced hollow protuberances therein, an insulating layer adhered to a portion of said base layer so that a row of adjacently spaced hollow protuberances extends from said base layer beyond said insulating layer along at least two edges of said panel to provide a locking means for adjacently spaced panels when said row of hollow protuberances is interlocked with an adjacently spaced panel having a layer of insulation over a row of similar hollow protuberances to be interconnected.

5. An insulating panel in accordance with claim 4 which further includes a layer of moisture repellant material overlying and adhered to said insulating layer.

6. An insulating panel in accordance with claim 5 wherein said insulating layer comprises a mixture of cork and asphalt, and said moisture repellant material comprises a bitumen impregnated fiber.

7. An insulating panel in accordance with claim 4 wherein the row of hollow protuberances along each edge of said panel is of a length equal to that of said panel and further characterized in that each row is disposed transverse to the other.

8. An insulating panel in accordance with claim 4 wherein said panel is rectangular and said insulating layer is adhered to a portion of said base so that a row of hollow protuberances extends along each of the four edges of said panel.

9. An insulating panel in accordance with claim 8 wherein each row of hollow protuberances extending beyond said panel is of a length equal to that of said panel so that when said panel is interlocked on each of its sides with an adjacent panel there will be no more than a pair of overlapping hollow protuberances.

10. An insulating panel in accordance with claim 4 which further includes a ventilation pipe extending through said panel.

References Cited

UNITED STATES PATENTS

| | | | |
|---|---|---|---|
| 1,191,863 | 7/1916 | Williams | 52—630 |
| 2,128,836 | 8/1938 | McVoy | 52—537 |
| 2,689,988 | 9/1954 | French | 52—630 XR |
| 2,771,164 | 11/1956 | Scurlock | 52—630 XR |
| 3,086,899 | 4/1963 | Smith et al. | 52—630 XR |
| 1,961,374 | 6/1934 | Mazer. | |
| 2,116,771 | 5/1938 | Seaman. | |
| 2,159,487 | 5/1939 | Nies. | |
| 2,173,797 | 9/1939 | Toohey et al. | |
| 2,192,516 | 3/1940 | Cunnington. | |
| 2,563,115 | 8/1951 | Huggins. | |
| 2,809,908 | 10/1957 | French. | |
| 2,840,179 | 6/1958 | Junger. | |
| 3,108,924 | 10/1963 | Adie. | |

FOREIGN PATENTS

| | | |
|---|---|---|
| 220,053 | 8/1957 | Australia. |
| 1,163,584 | 4/1958 | France. |
| 1,280,659 | 11/1961 | France. |
| 1,198,036 | 8/1965 | Germany. |
| 642,722 | 9/1950 | Great Britain. |
| 1,002,415 | 8/1965 | Great Britain. |
| 490,260 | 2/1954 | Italy. |

ROBERT S. WARD, Jr., Primary Examiner

U.S. Cl. X.R.

52—537, 615, 630; 118—33